(12) United States Patent
Bokelmann et al.

(10) Patent No.: US 7,922,230 B2
(45) Date of Patent: Apr. 12, 2011

(54) VEHICLE SEAT WITH A SEAT TILT ADJUSTMENT

(75) Inventors: Tobias Bokelmann, Grobenzell (DE);
Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/396,950

(22) Filed: Mar. 3, 2009

(65) Prior Publication Data

US 2009/0224585 A1   Sep. 10, 2009

(30) Foreign Application Priority Data

Mar. 5, 2008   (DE) .......................... 10 2008 012 597

(51) Int. Cl.
*B60N 2/62* (2006.01)

(52) U.S. Cl. ..................................... 296/65.09; 297/339

(58) Field of Classification Search ............... 296/65.09; 297/338, 339
See application file for complete search history.

(56) References Cited

U.S. PATENT DOCUMENTS

| | | | |
|---|---|---|---|
| 2,815,796 A | 12/1957 | Lobanoff | |
| 3,600,037 A * | 8/1971 | Lohr | 297/284.11 |
| 3,883,173 A * | 5/1975 | Shephard et al. | 297/312 |
| 4,152,024 A | 5/1979 | Farelli | |
| 4,368,916 A | 1/1983 | Blasin | |
| 4,382,629 A | 5/1983 | Froumajou | |
| 4,402,547 A | 9/1983 | Weston et al. | |
| 4,438,974 A | 3/1984 | Kresky et al. | |
| 4,475,769 A | 10/1984 | Crawford et al. | |
| 4,568,106 A | 2/1986 | Yokoyama | |
| 4,583,781 A | 4/1986 | Hatsutta et al. | |
| 4,623,192 A | 11/1986 | Koide et al. | |
| 4,629,252 A | 12/1986 | Myers et al. | |
| 4,636,003 A | 1/1987 | Siebler | |
| 4,717,203 A | 1/1988 | Meiller | |
| 4,753,479 A * | 6/1988 | Hatsutta et al. | 297/284.11 |
| 4,822,099 A * | 4/1989 | Negi et al. | 297/344.22 |
| 5,346,281 A | 9/1994 | Hughes | |
| 5,362,128 A * | 11/1994 | Wildern, IV | 297/284.11 |
| 5,370,440 A | 12/1994 | Rogala | |
| 5,397,167 A | 3/1995 | Fourrey et al. | |
| 5,482,349 A | 1/1996 | Richter et al. | |
| 5,531,503 A | 7/1996 | Hughes | |

(Continued)

FOREIGN PATENT DOCUMENTS

DE        35 32 608 A1    3/1987

(Continued)

OTHER PUBLICATIONS

Germany Office Action (10 2008 012 597.0-16), Jan. 14, 2009, pp. 1-4.

(Continued)

*Primary Examiner* — Dennis H Pedder
(74) *Attorney, Agent, or Firm* — Brooks Kushman P.C.

(57) ABSTRACT

A foldable vehicle seat assembly includes a pivotable seat back that is can be positioned into an upright position and a folded position. The pivotable seat back may optional also be able to be positioned in one or more additional positions thereby allowing a reclining or forward positioning of the seat back. The seat bottom cushion subassembly is positioned over the seat bottom reinforcement member. The pivotable seat bottom reinforcement member provides structural support to a forward section of seat bottom cushion subassembly when this section is raised during seat repositioning.

4 Claims, 4 Drawing Sheets

U.S. PATENT DOCUMENTS

| | | | |
|---|---|---|---|
| 5,588,707 | A | 12/1996 | Bolsworth et al. |
| 5,673,971 | A | 10/1997 | Wieclawski |
| 5,795,019 | A | 8/1998 | Wieclawski |
| 5,871,255 | A | 2/1999 | Harland et al. |
| 5,904,404 | A | 5/1999 | McCulloch et al. |
| 5,941,602 | A | 8/1999 | Sturt et al. |
| 5,979,985 | A | 11/1999 | Bauer et al. |
| 6,070,934 | A | 6/2000 | Schaefer et al. |
| 6,089,641 | A | 7/2000 | Mattarella et al. |
| 6,152,515 | A | 11/2000 | Wieclawski |
| 6,213,549 | B1 | 4/2001 | Wieclawski |
| 6,273,511 | B1 | 8/2001 | Wieclawski |
| 6,336,679 | B1 | 1/2002 | Smuk |
| 6,398,291 | B1 | 6/2002 | Reusswig et al. |
| 6,402,245 | B1 * | 6/2002 | Newton et al. ........... 297/284.11 |
| 6,520,581 | B1 | 2/2003 | Tame |
| 6,736,438 | B1 | 5/2004 | Wieclawski |
| 6,811,219 | B2 | 11/2004 | Hudswell et al. |
| 6,908,155 | B1 | 6/2005 | Wieclawski |
| 7,134,716 | B2 | 11/2006 | Wieclawski |
| 7,204,554 | B2 | 4/2007 | Wieclawski |
| 2006/0214459 | A1 * | 9/2006 | Kammerer et al. ........ 296/65.09 |
| 2010/0001560 | A1 * | 1/2010 | Gross et al. ................ 297/216.1 |

FOREIGN PATENT DOCUMENTS

| | | |
|---|---|---|
| DE | 43 04 597 C1 | 4/1994 |
| DE | 698 27 303 T2 | 8/1998 |
| DE | 199 55 296 C1 | 2/2001 |
| DE | 100 27 063 A1 | 6/2001 |

OTHER PUBLICATIONS

English Abstract corresponding to DE 698 27 303 T2.
English Abstract corresponding to DE 43 04 597 C1.
English Abstract corresponding to DE 100 27 063 A1.
English Abstract corresponding to DE 199 55 296 C1.

* cited by examiner

VEHICLE SEAT WITH A SEAT TILT ADJUSTMENT

CROSS-REFERENCE TO RELATED APPLICATIONS

This application claims foreign priority benefits under 35 U.S.C. §119(a)-(d) to DE 10 2008 012 597.0, filed Mar. 5, 2008, which is hereby incorporated by reference in its entirety.

BACKGROUND OF THE INVENTION

1. Field of the Invention

The present invention relates to vehicle seats that are both foldable and tiltable.

2. Background Art

Successful automotive vehicle design requires consideration of numerous diverse design objectives. Components comprising the automobile must often meet criteria ranging from strength and durability to style and comfort. Moreover, increased functionality combined with ease of operation are also important vehicle design characteristics.

One such consideration, is the effective design of small and mid-sized vehicles with improved storage capabilities. In order to temporarily enlarge the trunk space, newer automotive vehicles sometimes incorporate a fold down rear seat back. In these designs the rear surfaces of the seat backs are releasably latched to a cross member of the vehicle body, that runs behind the seat backs, between them and the trunk space. Typically, designs suffer by having little ability to adjust to a vehicle occupants comfort requirements. Moreover, although such designs work reasonably well, the ever increasing competitive nature of the automotive industry requires designs with improved functionality.

Accordingly, there is a need for improved vehicle seats that are foldable while providing enhanced functionality.

SUMMARY OF THE INVENTION

The present invention solves one or more problems of the prior art by providing in at least one embodiment a foldable, tiltable vehicle seat assembly. The vehicle seat assembly of this embodiment includes a pivotable seat back that is can be positioned into an upright position and a folded position. The pivotable seat back may optional also be able to be positioned in one or more additional positions thereby allowing a reclining or forward positioning of the seat back. The seat bottom cushion subassembly is positioned over the seat bottom reinforcement member. The pivotable seat bottom reinforcement member provides structural support to a forward section of seat bottom cushion subassembly when this section is raised during seat repositioning. Moreover, the seat bottom assembly may be adjusted in positions as desired by a seat occupant.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
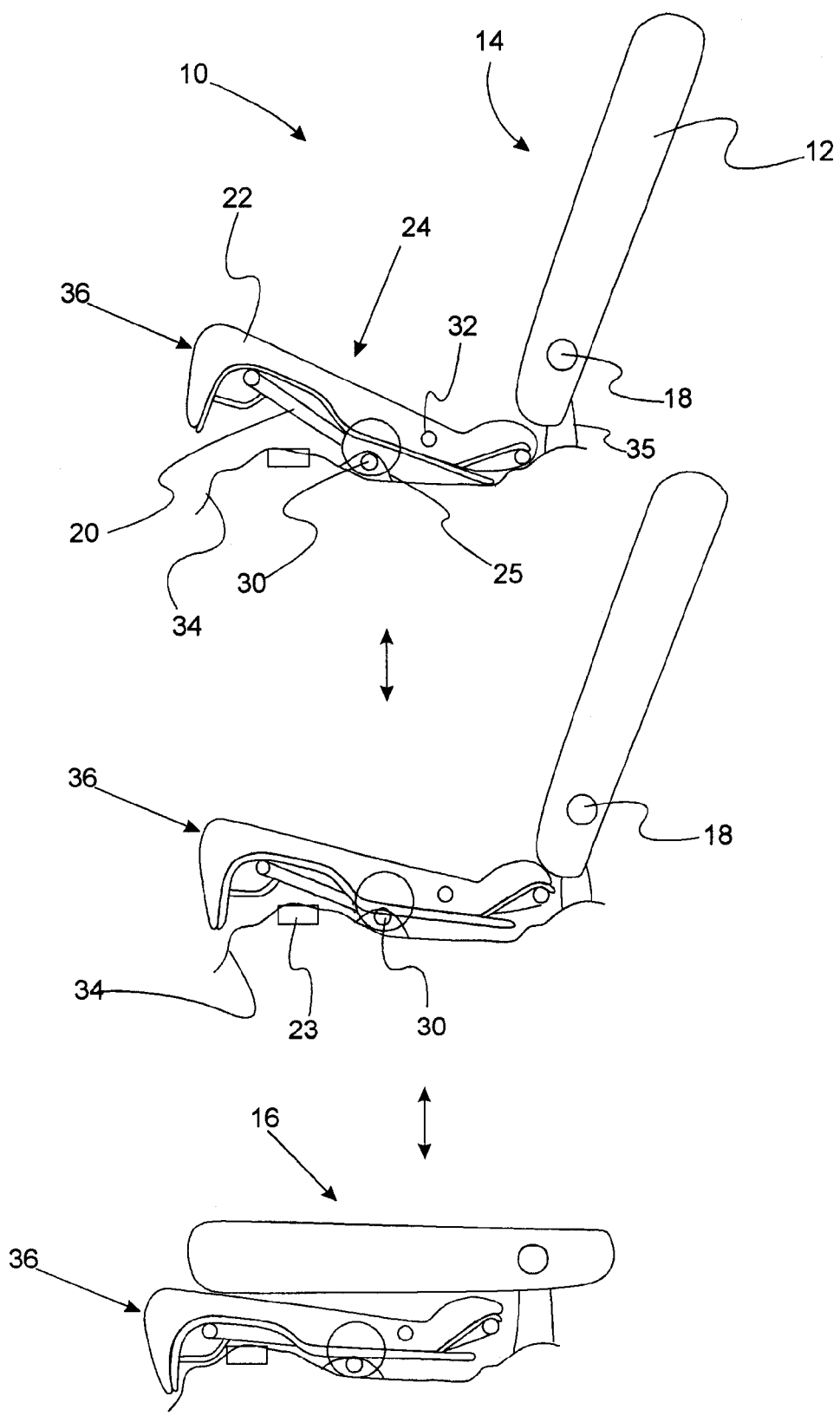
FIG. 1 is a schematic illustration of a vehicle seat assembly having a tilt adjustment.

In an embodiment of the present invention, a foldable vehicle seat assembly is provided. FIG. 1 provides a schematic illustration of the vehicle seat assembly of the present embodiment transitioning between the various tilted and folded positions. Vehicle seat assembly 10 includes seat back 12 that is positionable into upright position 14 and folded position 16. In a variation, seat back 12 is pivotable about pivot point 18. In a particularly useful variation of the present embodiment, pivotable seat back 12 is postionable in one or more additional positions thereby allowing a reclining or more forward (relative to upright position 14) positioning of seat back 12. Typically, an actuator will be utilized to positioning seat back 12 in the upright or folded position. Such an actuator is positioned proximate or attached to a vehicle seat bottom as depicted by item number 23. Seat bottom reinforcement member 20 is used to provide structural support to forward section 22 of seat bottom cushion subassembly 24 and attached to vehicle floor 34 via bracket 25. Seat bottom reinforcement member 20 is pivotable about pivot point 30. Seat bottom cushion subassembly 24 is positioned over the seat bottom reinforcement member 20. Moreover, seat bottom cushion subassembly 24 is pivotable about pivot point 32 thereby allowing the vehicle seat to be adjusted as desired by a seat occupant. Pivot location 32 is positioned a more rearward (relative to seat front 36) position relative to vehicle floor 34 than pivot location 30. Typically, seat back 12 is attached to vehicle floor 34 via bracket 35. Pivoting of seat bottom cushion subassembly 24 about pivot location 30 is advantageously accomplished without cushion crinkling or bending when the seat is not occupied.

Figure 2:
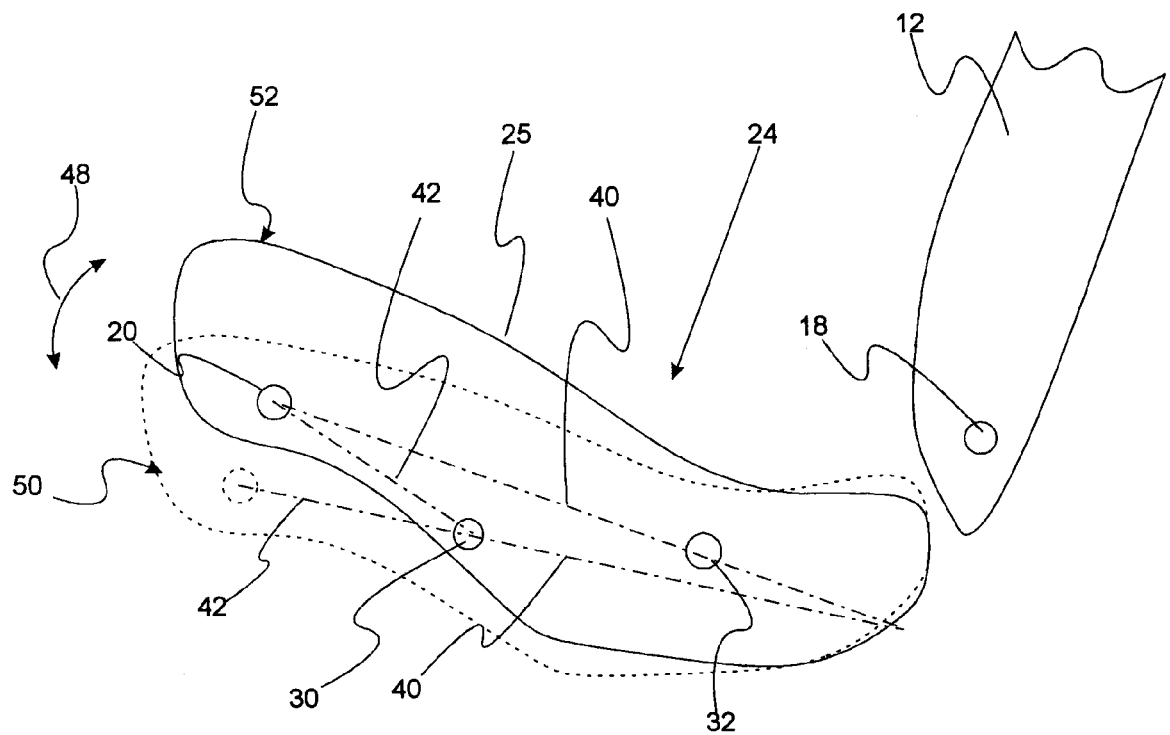
FIG. 2 is an idealized cross section showing the relative movements of the reinforcement member and the seat bottom subassembly.

With reference to FIG. 2, an idealized cross section showing the relative movements of the reinforcement member and the seat bottom subassembly. Axis 40 shows the relative movement of seat bottom subassembly 24. Axis 42 shows the relative movement of reinforcement member 20. FIG. 2 depicts the movement of seat bottom cushion subassembly 24 about pivot point 32 along direction 48. Seat bottom cushion subassembly 24 as depicted in lowered position 50 and raised position 52. In a variation, seat bottom subassembly 24 is positionable in a number of positions in order to allow adjustment of seat bottom subassembly 24 as desired by a vehicle occupant. Movement of seat bottom cushion subassembly 24 occurs with concurrent movement of reinforcement member 20. In variations of the present invention, movement of seat bottom cushion subassembly 24 is effectuated by reinforcement member 20 pushing against subassembly 24. Cushion subassembly 24 includes cushion 25. Advantageously, cushion 25 is able to be tilted in a manner such that it does not substantially crinkle or bend the seat bottom cushion assembly is moved between a lowered and raised position when an occupant is not sitting in the seat.

Figure 3:
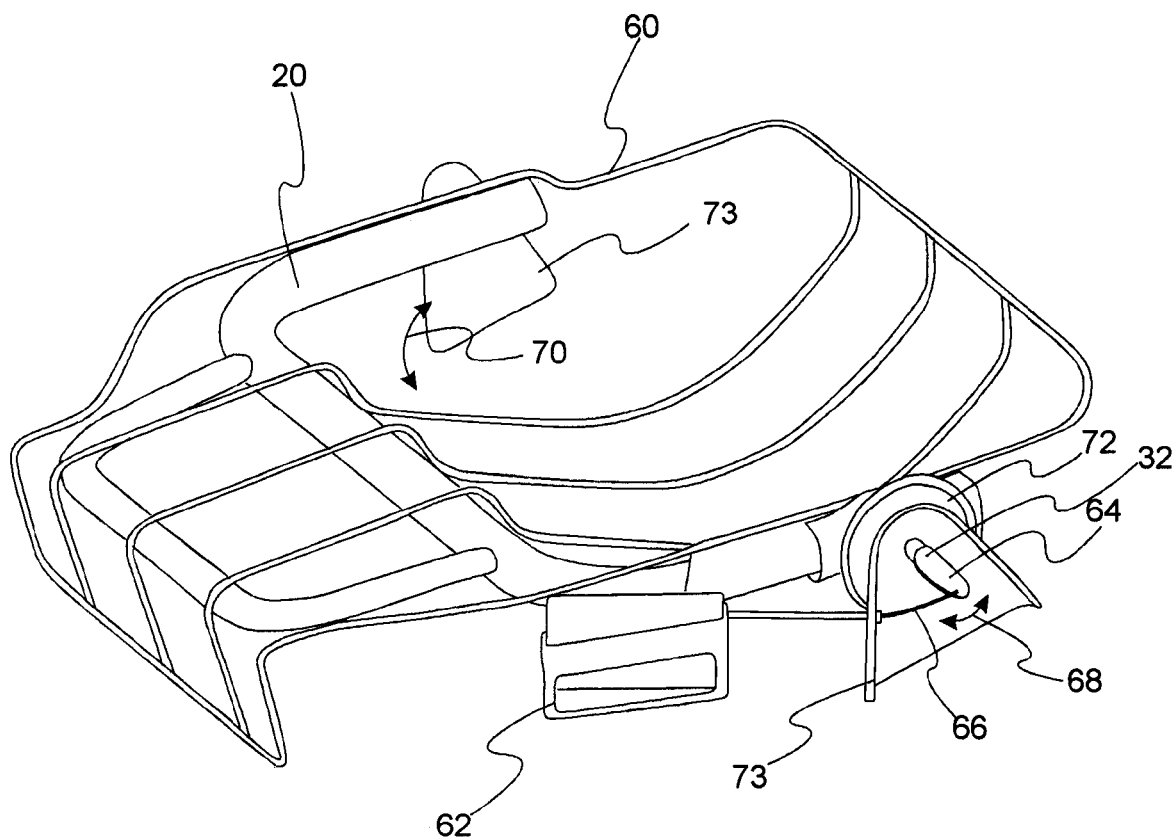
FIG. 3 is an schematic illustration a mechanism for moving a reinforcement member utilizing an actuator that causes rotations about a pivot point.
Figure 4:
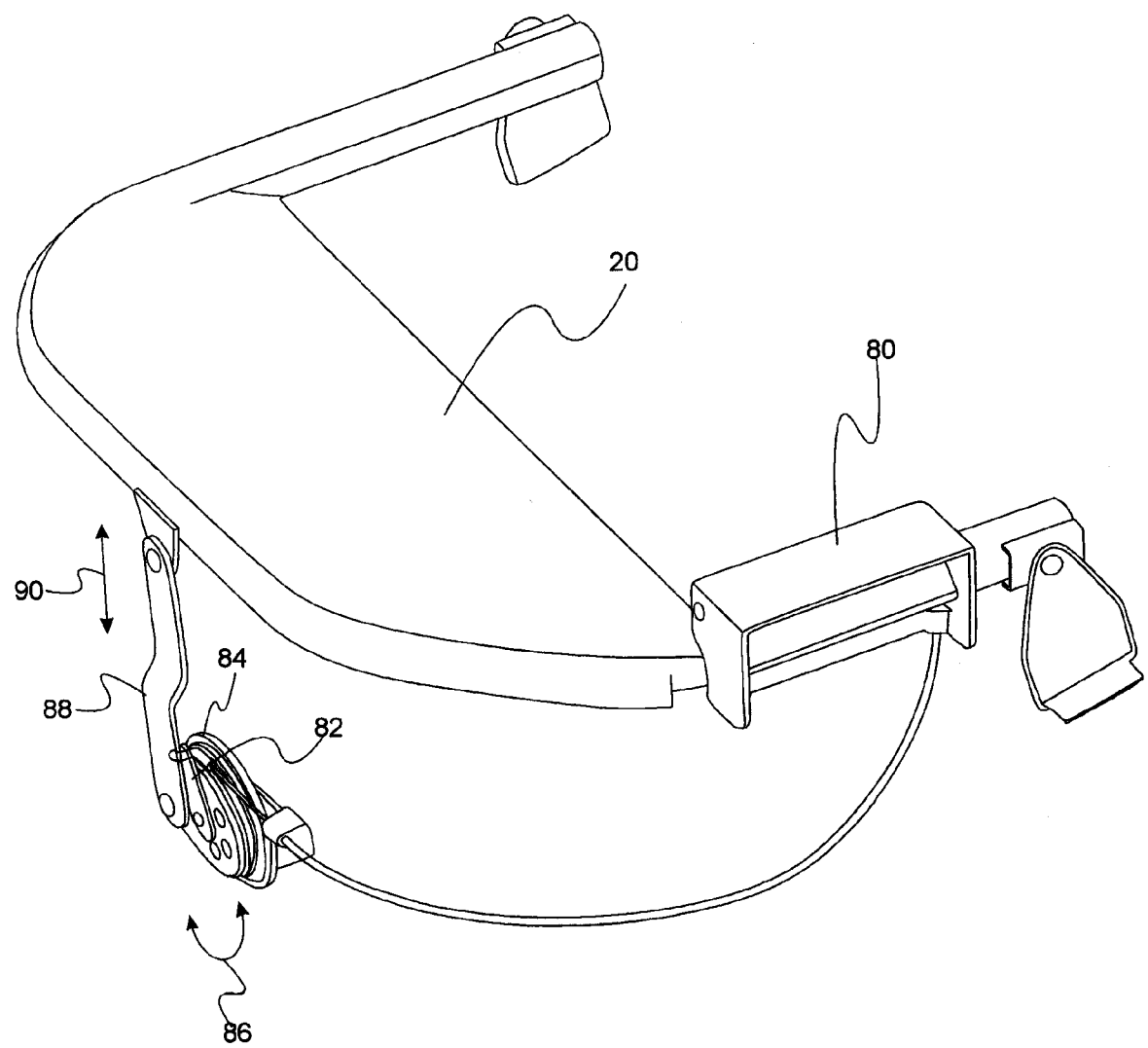
FIG. 4 is an schematic illustration a mechanism for moving seat bottom subassembly by pushing a forward position of the reinforcement member upward.

With reference to FIGS. 3 and 4, schematic illustrations of variations of the present invention showing latching subassemblies for positioning the seat bottom subassembly are provided. FIG. 3 provides an illustration utilizing an actuator that causes rotations about pivot point 32. Seat bottom cushion subassembly 20 includes seat bottom frame 60. Seat bottom frame 60 at least partially defines the shape of the seat bottom while also providing structural support. In this variation, operation of handle 62 causes pivoting of arm 64 about pivot point 32 through the movement of cable 66. In a further refinement, flywheel 72 assists with the stabilization of this movement. Specifically, arm 64 moves along direction 68 which cause movement of reinforcement member 20 along direction 70. In a refinement, cable 66 is disposed at least partially within hollow sheath 68 and relatively moveable therein. Brackets 73 secure seat bottom cushion subassembly 20 to the vehicle floor.

FIG. 4 provides an illustration of a latching mechanism for moving seat bottom subassembly by pushing a forward portion of the reinforcement member upward. In this variation, operation of handle 80 causes pivoting of arm 82 which in turn causes rotation of wheel 84 along direction 86. Actuator arm 88 which is pivotally attached to wheel 84 is then caused to move upward along direction 90 thereby raising reinforcement member 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a pivotable seat back positionable into an upright position and folded position;
   a pivotable seat bottom reinforcement member, the seat bottom reinforcement being pivotable about a first pivot point;
   a pivot arm in communication with the reinforcement member wherein movement of the pivot arm causes movement of the reinforcement member;
   a seat bottom cushion subassembly positioned over the seat bottom reinforcement such that a forward portion of the seat bottom cushion subassembly is supported by the reinforcement member, the seat bottom cushion subassembly being pivotable about a second pivot point that is more rearward than the first pivot point and the reinforcement member pushing against the seat bottom cushion subassembly during movement of the seat bottom;
   an actuator for positioning the seat bottom in one or more raised positions, wherein the actuator comprises a handle that is operable by a user and is positioned proximate or attached to a vehicle seat bottom;
   a cable such that operation of the handle causes pivoting of the pivot arm through the movement of the cable; and
   a flywheel that stabilizes movement of the pivot arm.

2. The vehicle seat assembly of claim 1 wherein the seat bottom cushion subassembly includes a cushion such that the seat bottom cushion subassembly is moveable between a lowered and raised position without bending or crinkling of the seat cushion.

3. The vehicle seat assembly of claim 1 wherein the seat back and the reinforcement member are each independently pivotable relative to a vehicle floor.

4. A vehicle seat assembly comprising:
   a pivotable seat back positionable into an upright position and folded position;
   a pivotable seat bottom reinforcement member, the seat bottom reinforcement being pivotable about a first pivot point;
   a pivot arm in communication with the reinforcement member wherein movement of the pivot arm causes movement of the reinforcement member;
   a seat bottom cushion subassembly positioned over the seat bottom reinforcement such that a forward portion of the seat bottom cushion subassembly is supported by the reinforcement member, the seat bottom cushion subassembly being pivotable about a second pivot point that is more rearward than the first pivot point and the reinforcement member pushing against the seat bottom cushion subassembly during movement of the seat bottom;
   an actuator for positioning the seat bottom in one or more raised positions, wherein the actuator comprises a handle that is operable by a user and is positioned proximate or attached to a vehicle seat bottom;
   a wheel; and
   an actuator arm, wherein operation of the handle causes pivoting of the pivot arm which in turn causes rotation of the wheel, rotation of the wheel causing the actuator arm to move in an upward direction thereby raising reinforcement member.

* * * * *